Jan. 3, 1933.                D. K. BLAKE                1,893,356
                      ELECTRICAL DISTRIBUTION SYSTEM
                           Filed May 25, 1931
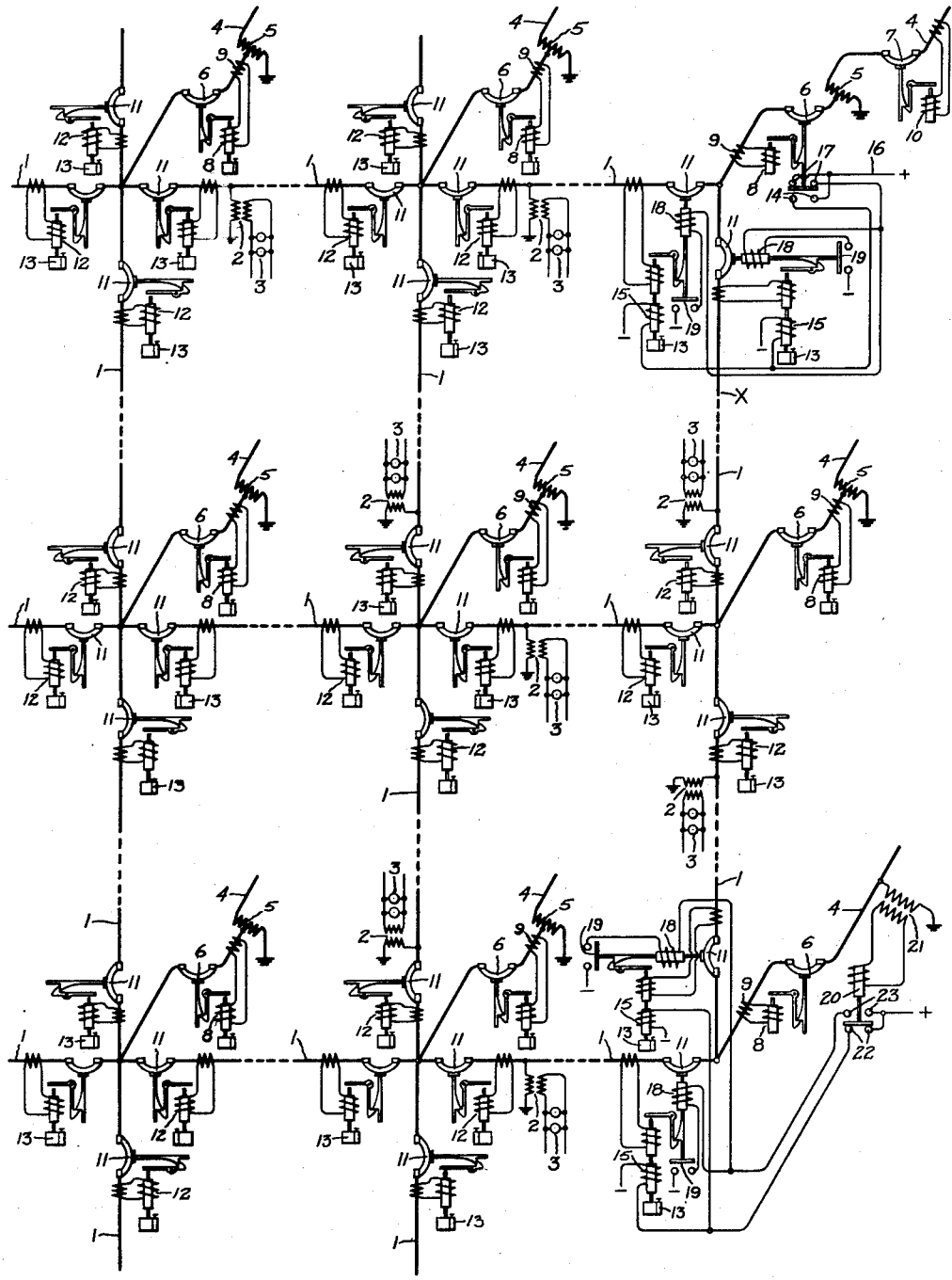
Inventor:
David K. Blake,
by Charles E. Tullar
His Attorney.

Patented Jan. 3, 1933

1,893,356

UNITED STATES PATENT OFFICE

DAVID K. BLAKE, OF SCOTIA, NEW YORK, ASSIGNOR TO GENERAL ELECTRIC COMPANY, A CORPORATION OF NEW YORK

ELECTRICAL DISTRIBUTION SYSTEM

Application filed May 25, 1931. Serial No. 539,973.

My invention relates to electrical distribution systems and more particularly to medium voltage alternating current network distribution systems.

In order that the advantages of increased reliability and continuity of service which come from the use of distribution networks may be fully realized, it is essential that the network be provided with protective equipment for isolating any of its conductors or sections on which a fault occurs. One such protective means or system which is very simple comprises inserting circuit breakers at the ends of each of the network conductors and controlling the tripping of these circuit breakers by inverse-time overload relays all of which have identical settings. In this way whenever a fault occurs on one of the network conductors, the maximum current will always flow through the relay which controls the circuit breaker in the circuit on which the fault occurs, because this fault current is made up of the sum of all the currents flowing in the other network conductors which are directly connected to the faulty conductor. Consequently, due to the identical relay settings, this breaker will be tripped first. This system is very simple and ordinarily gives adequate protection throughout the network. As will be seen, its operation depends upon the fact that no two circuit breakers or their controlling relays will be connected in series so that they both carry the same current when a fault occurs. However, at certain points in a network, usually but not necessarily at the corners thereof, a condition is likely to arise when two or more breakers and their control relays will actually be connected in series so that a fault current on one of the conductors connected to these breakers will flow through two or more in series. The result will be that, with the relays having identical settings, it will be impossible to predict which one of the circuit breakers will be tripped first and if the circuit breakers which are not nearest the fault are tripped the service will be interrupted to loads which are connected to sound conductors.

In accordance with my invention I provide means comprising interlocking connections between several of the breakers of the system whereby the occurrence of the undesirable condition outlined above is prevented.

It is an object of my invention to provide a new and improved electrical distribution system.

It is another object of my invention to provide a new and improved protective system for network distribution systems.

My invention will be better understood from the following description taken in connection with the accompanying drawing and its scope will be pointed out in the appended claims.

Reference will now be made to the single figure of the accompanying drawing wherein I have illustrated diagrammatically an embodiment of my invention. It should be noted at this point that most alternating current distribution network systems are polyphase systems, usually four wire three phase grounded neutral systems, but as the principles of my invention are independent of the number of phases, and as a drawing illustrating a polyphase system would appear exceedingly complex, I have illustrated my invention as a single phase grounded system, but it will of course be obvious to those skilled in the art that the single conductor shown may be considered but one of the conductors of a polyphase system if desired. As shown, conductors 1 are interconnected to form a grid-like network. This network is a medium voltage network, the voltage being preferably substantially 4000 volts. Energized from this network through step-down distribution transformers 2, are load circuits 3 which may or may not be interconnected to form a low voltage distribution network, as desired.

Connected to supply energy to the network at the interconnection points of conductors 1 are a plurality of high voltage feeder supply circuits 4, which are connected to the interconnection points of the network through step-down power transformers 5 and feeder circuit breakers 6. These feeder circuits are energized from any suitable source such as a central generating station, and contain at their transmitting ends high voltage circuit breakers 7.

The tripping means for the low voltage feeder circuit breakers 6 may be any well known kind such as reverse power overload relay means or merely simple overload relay means as illustrated. This means comprises overload relays 8 connected in the feeder circuit by current transformers 9. Likewise the high voltage feeder circuit breakers may be tripped by any suitable means such as by overload relays 10 which are connected to respond to the magnitude of the current flow in the feeder circuit 4.

The means for protecting the network from faults on each conductor 1 comprises individual circuit breakers 11 connected in each one of the conductors 1 of the network. These breakers are controlled by inverse-time overload relays 12 which are connected to respond to the magnitude of the current flow in the conductors 1. These relays may be of any well known type and are illustrated diagrammatically as including dashpots 13 as the time retarding means.

In the system in which I primarily intend to practice my invention the transformers 5 and breakers 6 and 11 which are associated with each intersection point will all have corresponding designs and ratings and will all be assembled to form standardized unit substations.

The operation of the relays is as follows. Consider for example an interconnection point of four of the conductors 1. If now a fault occurs on one of these conductors there will be a rush of fault current through this conductor and its circuit breaker. This current will be supplied by the feeder 4 as well as by all three of the other conductors 1. It will thus be seen that the current tending to trip the inverse-time overload relay of the breaker in the conductor 1 on which the fault has occurred will equal the sum of all the other currents flowing towards this breaker, and consequently this breaker will be tripped before any of the other breakers will be tripped. The same thing will take place at the intersection of the other side of the fault with the result that the faulty conductor 1 will quickly be isolated from the network with the result that only the loads connected to this faulty conductor will be deprived of energy.

Consider, however, the upper right hand corner of the network. If a fault should occur at the point X on the network and if at the same time the feeder 4 feeding the upper right hand interconnection point of the network is deenergized by the opening of one of the breakers therein, it will be obvious that the fault current flowing to the fault X will flow through the two upper right hand corner network circuit breakers in series. It will also flow through the next network circuit breaker in series so that there will be three of these breakers carrying the same fault current and as their settings are all the same, it will be impossible to tell which one of the breakers will trip first. If it should be the right hand network breaker of the upper center interconnection point of the illustrated network, all the loads previously supplied with power from the upper right hand conductor 1 only will be deprived of power.

In order to overcome this difficulty, I provide interlocking means between the two network circuit breakers associated with the upper right hand corner intersection of the network and the low voltage feeder circuit breaker in the feeder circuit supplying this corner. I have shown this means comprising back contacts 14 on circuit breaker 6 which are connected to auxiliary tripping means 15 of the two network circuit breakers 11 through any convenient source of current supply, such as a supply bus 16. In this way, whenever circuit breaker 6 is tripped, thereby cutting off the power supply to this corner intersection, the network circuit breakers associated with this corner intersection will likewise be trpped with the result that if a fault occurs on either one of the conductors 1 connected to this corner intersection, the other one of these conductors will still be energized by its connection to the rest of the network at the other end.

I preferably also provide automatic means for reclosing these network circuit breakers when the feeder circuit breaker is closed. As shown, this means comprises a pair of contacts 17 on circuit breaker 6 which close when this circuit breaker closes and which complete an energizing circuit including source 16 and reclosing means, such as coils 18 on breakers 11. These circuits are then broken by back contacts 19 on breakers 11 as soon as the breakers close.

At the lower right hand corner of the network, I have illustrated a modified arrangement whereby the corner network circuit breakers 11 are tripped and reclosed automatically through a relay 20 whenever the feeder 4 is deenergized regardless of whether the low voltage feeder circuit breaker 6 is open or closed.

As shown, this relay 20 is energized from the feeder circuit 4 through a potential transformer 21. Normally open contacts 22 of this relay when closed control the auxiliary tripping circuits of the two network circuit breakers 11, while the normally closed upper contacts 23 of relay 20 control the reclosing circuits for these circuit breakers. The operation of this modification is otherwise the same as that for the upper right hand corner of the illustrated network.

It will be seen that the above described arrangement increases the reliability and continuity of service of the network by automatically breaking the circuit through the corner intersections of the network whenever the corner intersections are not being supplied with power by their respective feeder circuits. It will of course be obvious to those skilled in the art that the same results could be secured by merely automatically tripping one of the two network circuit breakers associated with a corner intersection whenever the feeder circuit supplying this intersection is deenergized or whenever the circuit breaker in this feeder is tripped open. By automatically interlocking both of these breakers with the feeder breaker, however, the safety factor of the system is improved. The result of the illustrated arrangement is that whenever one of the corner intersections of the network, or more generally, whenever any intersection point involving only two network conductors is not being supplied with power, all the load devices connected to these two network conductors will be supplied with energy from the network from the other ends of the network conductors. This, however, is what takes place regardless of whether the corner network breakers are tripped or not so long as the supply feeder is deenergized.

While I have shown and described particular embodiments of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:—

1. In combination, a network of interconnected alternating current conductors having a junction point of two conductors per phase, means for supplying energy to said network at said junction point and means operative in accordance with failure of energy supply to said junction point for breaking the connection through said junction point.

2. In combination, an alternating current electrical distribution network comprising a plurality of interconnected conductors, said network having a corner interconnection of two conductors, circuit breakers in the two conductors which form said corner connection, a feeder circuit connected to said corner, means for disconnecting said feeder circuit from said corner interconnection, and means operative in accordance with the disconnection of said feeder circuit from said corner interconnection for tripping at least one of said circuit breakers.

3. In combination, an electrical distribution system comprising a plurality of feeder circuits, conductors interconnecting said feeder circuits to form a distribution network, some of said feeder circuits being connected to but two network conductors, circuit breakers connected between the conductors and the feeder circuits, inverse-time overload relays for controlling the tripping of said breakers, and additional means responsive to failure of energy supply from the feeder circuits connected to junction points of but two conductors for tripping the two breakers which are associated with any one of said last mentioned feeder circuits.

4. In combination, an electrical distribution system comprising a plurality of feeder circuits including feeder circuit breakers, conductors connecting the adjacent ends of the feeder circuits whereby a network is formed, separate circuit breakers in each of said network conductors adjacent the ends of each of the feeder circuits to which said conductors are connected, inverse-time overload relays for controlling the tripping of each of said network breakers, and interlocking means between the feeder circuit breakers whose feeder circuits are connected to only two network conductors and the network breakers in said two conductors which are adjacent said feeder circuit breakers whereby these breakers are opened and closed together.

5. In combination, a plurality of electrical conductors interconnected to form a gridlike electrical distribution network, means including feeder circuit breakers and feeder circuits for supplying energy to said network at the interconnection points in said network, network circuit breakers for isolating each of said conductors from its connection points in the network, inverse-time overload relays associated with each of said network breakers for tripping them, and means associated with the network breakers adjacent a corner interconnection of said network for tripping them when the breaker in the feeder circuit whicih energizes said corner interconnection is tripped.

6. In combination, a plurality of electrical conductors interconnected to form a grid like electrical distribution network, means including feeder circuit breakers and feeder circuits for supplying energy to said network at the interconnection points in said network, network circuit breakers for isolating each of said conductors from its connection points in the network, inverse-time overload relays associated with each of said network breakers for tripping them, and means associated with the network breakers adjacent a corner interconnection of said network for tripping them when the feeder circuit which energizes said corner interconnection is deenergized.

7. In combination, a medium voltage electrical distribution network including a plurality of unit substations, said substations including a main circuit breaker and a plurality of network circuit breakers, high voltage feeder circuits connected to supply energy to said network through said main and network circuit breakers respectively, most of said substations having four network circuit breakers connected in said network but some of them having only two network circuit breakers connected in said network, inverse-time overload relays with identical settings arranged respectively to trip their respective network breakers, and interlocking means between the main circuit breaker and the network circuit breakers of each substation having only two network breakers whereby said three breakers all open and close together.

In witness whereof, I have hereunto set my hand.

DAVID K. BLAKE.